United States Patent
O'Connor

(10) Patent No.: US 9,082,131 B2
(45) Date of Patent: Jul. 14, 2015

(54) METHOD AND APPARATUS FOR TRACKING ITEMS AND PROVIDING ITEM INFORMATION

(75) Inventor: Raymond M. O'Connor, Pleasanton, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 29 days.

(21) Appl. No.: 13/361,090

(22) Filed: Jan. 30, 2012

(65) Prior Publication Data

US 2013/0193200 A1    Aug. 1, 2013

(51) Int. Cl.
*G06F 17/00* (2006.01)
*G06Q 30/02* (2012.01)

(52) U.S. Cl.
CPC ........ *G06Q 30/0241* (2013.01); *G06Q 30/0281* (2013.01)

(58) Field of Classification Search
USPC ............. 235/375, 462.46; 725/62; 340/686.1; 455/414.1
See application file for complete search history.

(56) References Cited

U.S. PATENT DOCUMENTS

| | | | |
|---|---|---|---|
| 7,273,175 B2 | 9/2007 | Zhao et al. | |
| 2006/0019660 A1* | 1/2006 | Li | 455/434 |
| 2006/0138219 A1* | 6/2006 | Brzezniak et al. | 235/383 |
| 2007/0063050 A1* | 3/2007 | Attia et al. | 235/462.46 |
| 2009/0108057 A1 | 4/2009 | Mu et al. | |
| 2010/0001072 A1 | 1/2010 | Onogi | |
| 2010/0142758 A1* | 6/2010 | Pinhas et al. | 382/103 |
| 2011/0085732 A1 | 4/2011 | Cheng | |
| 2011/0225633 A1* | 9/2011 | Pai | 726/5 |
| 2012/0109773 A1* | 5/2012 | Sipper et al. | 705/26.3 |
| 2012/0166270 A1 | 6/2012 | Coppinger | |
| 2013/0046608 A1* | 2/2013 | Coppinger | 705/14.27 |
| 2013/0144772 A1* | 6/2013 | Huang et al. | 705/35 |
| 2013/0191246 A1* | 7/2013 | Calman et al. | 705/26.9 |

OTHER PUBLICATIONS

International Search Report from International Patent Appln. No. PCT/US13/23224 filed Jan. 25, 2013; Mailed Jan. 16, 2014; pp. 1-5.
Written Opinion from International Patent Appln. No. PCT/US13/23224 filed Jan. 25, 2013; Mailed Jan. 16, 2014; pp. 1-6.

* cited by examiner

*Primary Examiner* — Allyson Trail
(74) *Attorney, Agent, or Firm* — Chiesa, Shahinian & Giantomasi PC

(57) ABSTRACT

A method and apparatus for tracking products and providing product information receives information from a user device at a product server. A user scans a Quick Response code (QR code) using a mobile communication device which transmits product identification information from the QR code and user device information to a product server. The product server determines product information associated with the product identified by product identification information received from the user device. The product information is transmitted by the product server to the user device. The information received from the user device can also be used to track the location of products and acquire user information.

9 Claims, 6 Drawing Sheets

FIG. 3

| | 302 | 304 | 306 | 308 | 310 | 312 | 314 | 316 | 318 | 320 | 322 |
|---|---|---|---|---|---|---|---|---|---|---|---|
| | Unique ID | Name | Address | City | State | Zip Code | Phone | Gender | D.O.B | Native Language | Email Address |
| 324 | 1 | Jon Smith | 335 Main St. | Miami | FL | 33101 | 305 555 1212 | Male | 10/15/1970 | English | jsmith@internetspace.com |
| 326 | 2 | Jane Doe | 123 Cross St. | Albany | NY | 12201 | 518 555 1212 | Female | 9/15/1980 | Spanish | jdoe@interweb.com |
| | ... | ... | ... | ... | ... | ... | ... | ... | ... | ... | ... |
| 328 | 1001 | Albert Small Jaymez | 11 Hill St. | Sacramento | CA | 94200 | 912 555 1212 | Male | 1/5/1965 | English | wobble@webcom.com |

| | Unique ID | Make/Model Identifier | Make | Model | Date of Mfg. | Date of Expiration | Web Address | Current Location | Previous Location |
|---|---|---|---|---|---|---|---|---|---|
| 420 | 1 | 10521 | Zolo | Canteen 1 | 12/1/2010 | N/A | www.zolo.com/canteen1 | Bakersfield, CA | 40:54:38N, 74:24:39W |
| 422 | 2 | 10628519 | Alpha | 85 | 4/16/2011 | 5/16/2012 | www.alphabeverages.com/aplha85 | Albany, NY | Kingston, NY |
| 424 | ... | ... | ... | ... | ... | ... | ... | ... | ... |
| | 1001 | 100254 | Leonard | Elite | N/A | N/A | www.leonardservices.com/elite | 41:55:39N, 74:25:40W | Sacramento, CA |

| | 502 | 504 | 506 | 508 | 510 | 512 | 514 | 516 |
|---|---|---|---|---|---|---|---|---|
| | Unique ID | Make/Model Identifier | Make | Model | Software Updates | User Manual (Language) | User Manual (Location) | User Manual File |
| 518 | 1 | 10521 | Zolo | Canteen 1 | V1.2 | English | North America | 12566.pdf |
| 520 | 2 | 10628519 | Alpha | 85 | V4.5.exe | English | East Coast | 45831.pdf |
| | ... | ... | ... | ... | ... | ... | ... | ... |
| 522 | 1001 | 100254 | Leonard | Elite | N/A | Italian | Italy | 687943.pdf |

500

METHOD AND APPARATUS FOR TRACKING ITEMS AND PROVIDING ITEM INFORMATION

FIELD OF THE DISCLOSURE

The present disclosure relates to tracking items using identifiers and providing information pertaining to the items. More particularly, a method and apparatus for tracking items using QR codes and providing information pertaining to the items is described.

BACKGROUND OF THE INVENTION

Quick Response codes (QR codes) are two-dimensional graphical symbols encoding information. QR codes are designed to be scanned by an optical scanner and subsequently decoded to determine the information contained in the QR code. Mobile communication devices such as cell phones can include a QR code reader or be otherwise configured to acquire and interpret QR codes.

QR codes are often displayed associated with advertisements for various products and events. For example, an advertisement in a magazine for a new movie can include a QR code. A mobile device, such as a cell phone, configured to read QR codes can be used to scan the QR code associated with the new movie. The QR code may contain information identifying a web address associated with a website for the new movie. The website can provide additional information concerning the movie such as a trailer.

Maintenance and repair of products often requires the use of product manuals, schematics, and trouble shooting charts. However, the product usually requires repair some time after the product was purchased and the product manuals and related materials are often not immediately available because they have been lost or misplaced.

BRIEF SUMMARY OF THE INVENTION

The present invention pertains to tracking items using Quick Response codes (QR codes) and providing a user with product information based on information contained in the QR code and additional information associated with a user device.

In one embodiment, a method for providing product information comprises receiving product identification and user device information from a user device at a product server. The product identification is derived from a Quick Response code (QR code) associated with the product. Product information is transmitted to the user device based on the received product identification and user device information. The user device information may comprise a location of the user device and identification of a user associated with the user device. The product identification may comprise a unique identifier associated with a particular product. The product information may be based on the location of the device. The received product identification and user device information may be stored.

An apparatus and computer readable medium for providing product information are also described.

These and other advantages of the invention will be apparent to those of ordinary skill in the art by reference to the following detailed description and the accompanying drawings.

BRIEF DESCRIPTION OF THE DRAWINGS

FIG. 3 depicts records of a user information database according to one embodiment;

FIG. 4 depicts records of a product information database according to one embodiment;

FIG. 5 depicts records of a product manual database according to one embodiment.

DETAILED DESCRIPTION

Figure 1:
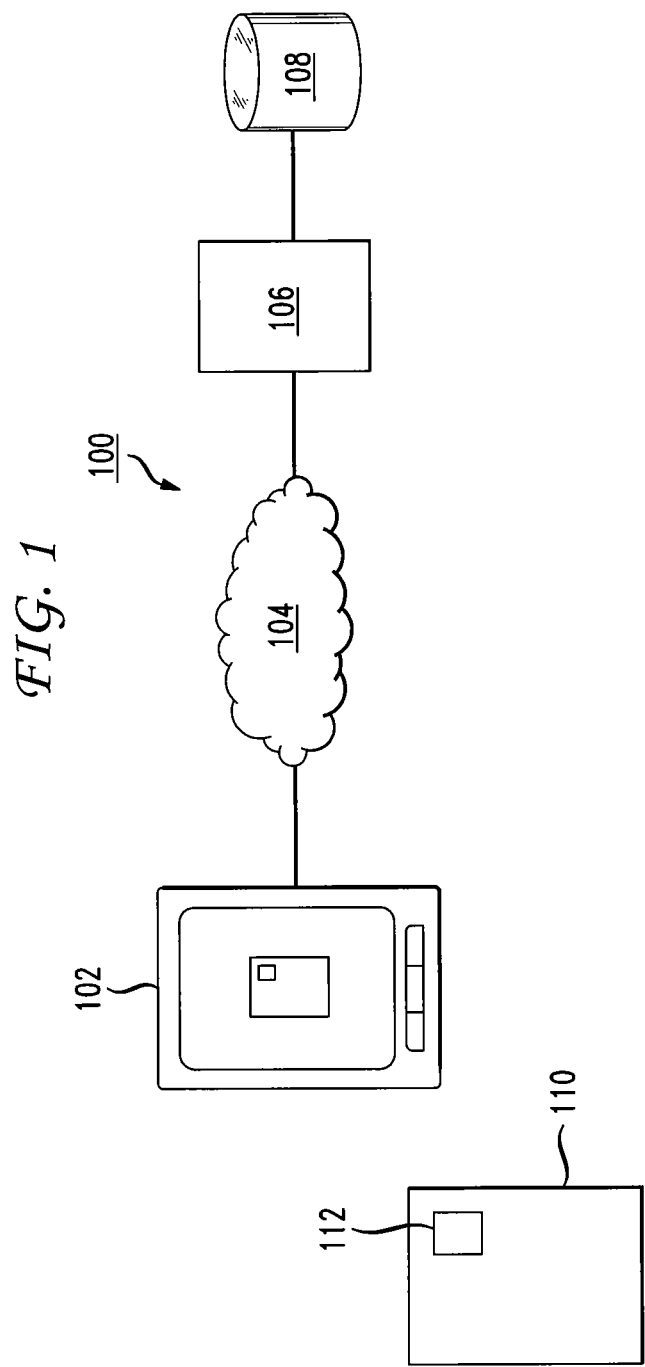
FIG. 1 depicts a system for providing information to a user based on a Quick Response code (QR code)

FIG. 1 depicts a system for providing information to a user based on a Quick Response code (QR code). Mobile communication device 102 can be a cell phone, smart phone, personal digital assistant, hand held computing device, or other device for communication. Mobile communication device 102 is configured to read and interpret QR codes such as QR code 112 located on product 110 using one or more of a variety of methods. For example, device 102 can be configured to capture an image of a QR code for analysis or scan a QR code using a light beam such as a laser. Product 110 can be any product or item such as a car, boat, construction equipment, television, etc., or any part or component thereof.

Mobile communication device 102, in one embodiment, can determine its location. For example, mobile communication device 102 may be equipped with a global positioning system (GPS) receiver or other mechanism for determining location (e.g., cell phone tower triangulation or wireless node detection). Since the location of mobile communication device 102 can be determined, and mobile communication device must be near a QR code in order to scan the QR code, the location of an item or product associated with the scanned QR code is known as well.

Mobile communication device 102 is in communication with server 106 via network 104. Network 104 can be a wire line or wireless network, local area network or wide area network, the Internet, etc. or a combination of networks. Server 106 is in communication with database 108 which may be local to server 106 or remote, in which case, server 106 communicates via network 104. Server 106, in one embodiment, is configured to receive requests from mobile communication device 102 including a QR code (e.g., QR code 112), or information based on a QR code. In response, server 106 determines relevant information contained in database 108 based on QR code 112 and, in some embodiments, additional information received from mobile communications device 102.

QR codes are two-dimensional graphical representations of information that can be printed on materials such as paper, cloth, plastic, metal, etc. QR codes depict information in a format that can be scanned and interpreted by a device such as a QR code scanner or mobile communication device (e.g., mobile communication device 102 shown in FIG. 1). QR codes can contain varying amounts of information, for example, from a few characters to thousands of characters. QR codes often contain a web address, which can be used to provide information such as information related to a product or service associated with the code. For example, a QR code can be included on labels affixed to a box containing a product. In one embodiment, a QR code is placed directly on an item. For example, a QR code can be silkscreened directly onto a product. A QR code can also be located directly on a product by molding the QR code onto the product or etching the QR code onto a product surface.

QR codes can also contain identification information. In one embodiment, a QR code can contain information identifying a particular item or product associated with the QR code. For example, a particular brand and model of an item can be identified by information contained in a related QR code that may be located on the product or product packaging. A QR code can also identify a particular version of a product. In one embodiment, a QR code contains a unique identifier (e.g., a serial number) which can be used to identify a particular item with which the QR code is associated. In addition, the QR code can contain information such as date of manufacture, version number, expiration date, etc., or any other variant of a product.

Mobile communications device 102, in one embodiment, contains information identifying the user (e.g., the owner) of the device. For example, a user's name, address, telephone number can be stored in mobile communications device 102. In one embodiment, additional user information can be stored in mobile communications device such as a user's language preference, location preference, product preference, etc. Alternatively, mobile communications device 102 may store only a unique phone identifier, which can be used to obtain the above described user information.

Figure 2:
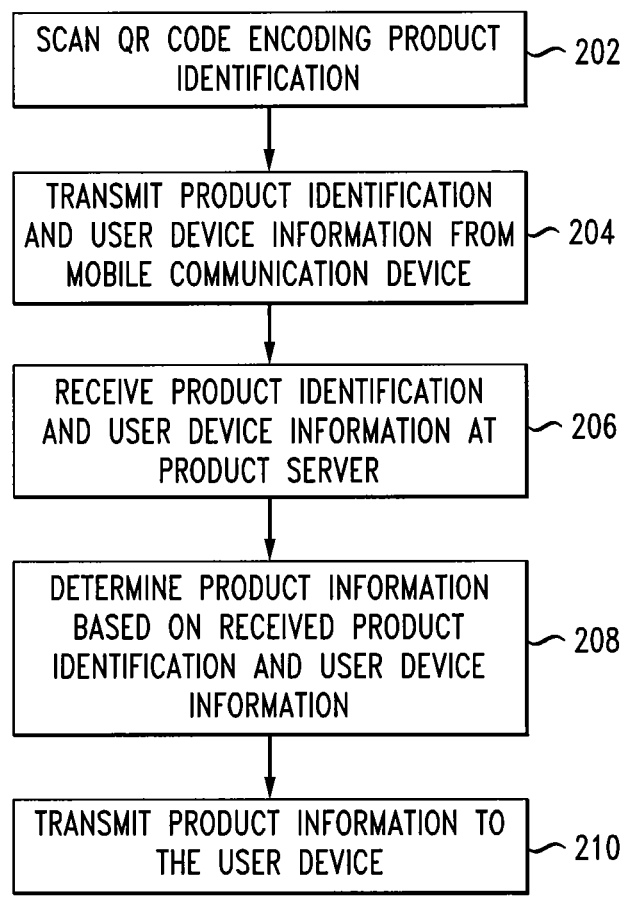
FIG. 2 depicts a flow chart of a method for providing a user with information based on a QR code and user device information according to one embodiment.

FIG. 2 depicts a method according to one embodiment for providing a user with product information based on a QR code and user device information. A user may want to obtain information concerning a particular product or item. For example, a user may be a technician who has been assigned a task of troubleshooting a problem with a particular product and would like to review user manuals, parts manuals, parts lists, user videos, trouble shooting guides, user blogs, updates, product history, etc. for the particular product. At step 202, the user scans QR code 112, in this scenario, located on product 110, using mobile communications device 102 (also referred to as user device 102). QR code 112 encodes product identification information. In one embodiment, QR code 112 encodes product information including the make and model of the particular product. In another embodiment, QR code 112 encodes product information identifying the particular product with which QR code 112 is associated (e.g., a unique serial number associated with the particular product). In another embodiment, QR code 112 encodes information concerning variations of a product such as release version, configuration version, etc. At step 204, user device 102 transmits product identification obtained from QR code 212 to product server 106 via network 104. In one embodiment, user device information is also transmitted to product server 106. The user device information transmitted, in one embodiment, comprises a unique user identifier that can be used to identify user information, user preferences, demographics, etc. In another embodiment, the user device information also comprises information identifying the location of user device 102 at the time QR code 212 was scanned in step 202.

At step 206, the product identification (and user device information in certain embodiments) are received at product server 106. At step 208, product server 106 determines and/or identifies product information based on the received product identification and user device information. Product information, in one embodiment, comprises product manuals, such as repair or service manuals, parts lists, software downloads, and additional information associated with a product. The specific product information determined and/or identified in step 208 can be based on the particular product identified by the QR code. For example, the QR code may include a unique identifier associated with the particular product (e.g., a serial number). The unique identifier can be used to determine the specific version of the particular product identified by the QR code. The specific version may be configured in a specific hardware configuration and be associated with a specific version of software and require product manuals, parts lists, software versions, etc. specific to the specific version of the particular product. Product server 106, in one embodiment, determines product information by querying database 108 described in detail below. At step 210, product server 106 transmits product information to the user device via network 104.

FIG. 3 depicts a user information table 300 comprising user records that may be stored in a database (e.g., database 108) accessible by product server 106. In one embodiment, each record comprises a unique ID 302 for uniquely identifying each record. In one embodiment, unique ID 302 is a unique user identifier. Each record also includes name 304, address 306, city 308, state 310, ZIP code 312, phone 314, gender 316 and date of birth 318. Native language 320 is used to store a user's native or preferred language. Email address 322 column is used to store information pertaining to a user's email address. Exemplary information associated with exemplary users is stored in each of records 324, 326, and 328 as depicted in FIG. 3. Additional information related to a user may be stored as well. For example, previous products searched for by a user and identification of products a user (e.g., a technician) is responsible for may be stored in database 108 as well. In one embodiment, user information contained in a particular record of table 300 may be populated the first time the associated user attempts to retrieve product information. The information contained in each record can be obtained from user device 102 and associated with a unique user ID. In one embodiment, subsequent requests from a particular user contain only the unique user ID (e.g., unique ID 302) and additional user information can be determined using the unique user ID to access a particular record (e.g. 324, 326, or 328) of table 300.

FIG. 4 depicts a product information table 400 which includes records 420, 422, and 424, each containing information related to products. Unique ID 302 stores a unique product identifier. Make/Model Identifier 404 contains a designation of a particular make and model of product. Make 406 contains information identifying a particular make by name (i.e., text). Similarly, model 408 identifies a particular model by name (i.e., text). Date of Mfg. 410 indicates a product's date of manufacture, if applicable, while date of expiration 412 indicates the product's expiration date if applicable. Web address 414 identifies a website associated with a product. The location of a particular product determined by mobile communication device 102 (i.e., the location of mobile communication device determined via a GPS receiver when a QR code associated with a product is scanned) can be recorded in current location 416 and previous location 418. Information associated with each particular product is stored in each of records 420, 422, and 424. The information contained in table 400, in one embodiment, is obtained from or provided by a manufacturer and entered into table 400. Product information table 400 can be queried in different ways to identify product information. For example, if only the make and model of a product is determined by a QR code, columns 406 and 408 may be used to determine information available for specific products. A QR code containing a unique product identifier, such as a serial number, may be used to find product information using Unique ID 402.

FIG. 5 depicts a product manual table 500 which includes records 518, 520, and 522, each containing information related to products. More specifically, table 500 contains product manuals and software updates for various products.

Unique ID 502, Make/Model Identifier 504, Make 506, and Model 508 contain information similar to the corresponding fields described in connection with FIG. 4. Software Updates 512 stores information concerning versions of software associated with products. For example, the software update field for record 518 contains "V1.2" indicating that the current version of software for the related product is version 1.2. Software updates 510, in one embodiment, can contain updates stored in an actual file. For example, the software update field for record 520 contains an executable file named "V4.5.exe". A user can download an executable file stored in table 500 in order to update the software on a product. User Manual (Language) 512 stores an indication of the language in which an associated user manual is written. User Manual (Location) 514 stores a location in which a user manual is applicable. For example, certain products sold in different locations may be configured differently. As a result, the user manual may be specific to the location in which a product is located. User Manual File 516 stores an electronic copy of a user manual identified by the particular associated record (e.g., 518, 520, or 522). Additional product information such as parts lists, wiring diagrams, component lists, etc. can be stored in product manual table 500. The information contained in table 500 can be accessed in various ways. For example, one or more record can be accessed based on information contained in Make 506 and Model 508 fields. A user can retrieve all records having Make 506 and Model 508 fields which match related information encoded in a QR code. It should be noted that multiple records may be identified for a particular product (unique product). This is because there may multiple product manuals in different languages and manuals for use with products located in different geographic areas. One of the product manuals can be selected for a particular user based a user's native language (field 320 of FIG. 3), or based on the location of a particular product (i.e., the location of the product identified in user device information received in step 204 of FIG. 2).

Various information can be provided to a user based on the method of FIG. 2 in conjunction with the records depicted in FIGS. 3-5. The information provided can be also be based on user device information. For example, in one embodiment, a technician on the west coast of the United States can scan a QR code associated with a product in order to obtain additional information related to the product. As described in FIG. 202, a user scans a QR code at step 202 with user device 102 and product identification along with user device information is transmitted from user device 102 via network 104 to product server 106. Product server 106 determines product information based on the product identification and user device information. In this embodiment, the user device information includes the location of the user device at the time the QR code was scanned, in this case, the west coast. Using this location information, the product information provided to the user can be based on location. In one embodiment, location information can be used to provide a user with the location of dealers and/or distributors of products near the user device location. For example, a map can be displayed to a user with indicators (e.g., virtual pins) identifying the location of the user device and nearby dealers and/or distributors. In one embodiment, the location information can be used to determine similar products, units, or installations located near the user device location. The contact information for service people near the product location can also be provided to a user based on the location information. In addition, product information can be provided to the user in an appropriate language based on the location information. Since this particular user located in the United States, the language would be English. For users located in other countries, an appropriate language would be used. In addition, since the technician is located on the west coast, if products located on the west coast require a different product manual, the correct manual is selected for the user based on the product location determined by the mobile communication device. It should be noted that user device information may identify a language preferred by a user which may override the location based language selection.

Since product information can change after a product has been shipped, the changed information or any additional information cannot easily be supplied with the product after purchase or installation. However, a user can obtain the changed or additional information by scanning the QR code as described. Product information can be changed, updated or added to electronically using a database such as product information database 108.

Product identification and user device information can also be used to provide a user with additional product information such as schematics and trouble shooting guides. Although not shown in FIG. 5, additional fields identifying and storing product information such as schematics and trouble shooting guides can be used to provide additional information to a user.

In addition to providing information to a user, the method of FIG. 2 in conjunction with the database records depicted in FIGS. 3 and 4 can be used to provide information to manufacturers and sellers (e.g., retailers).

After a user scans a QR code and the product identification and user device information is transmitted to product server 106, the information transmitted by the user device can be used to generate a record in the user information database 300. For example, when a transmission is received containing user device information for which a database record cannot be found, a new record can be created using the transmitted information. A user's name, address, phone number, gender, date of birth, native language, and email address contained in the transmitted information can be used to create a new record in user information database 300. The user information, in conjunction with the product identification information, can be used by manufacturers and sellers to keep track of the location and ownership of products. For example, based on a user's use of a particular product or service which, in turn is based on a user scanning a QR code, manufacturers and sellers can track usage and operation of products.

Transmissions from a user device can also be used to track the location of products. For example, when a user scans a QR code associated with a product, information indicating the location of the product can be transmitted to product server 106. This location information can be stored in product information database 400 and used by manufacturers or sellers to track the location of the product.

It should be noted that the phrases "product identification" and "product information" are used for convenience and to aid in understand various aspects of the inventive concept. Those phrases are not intended to limit the information contained in the QR code or the information stored in database 108 queried by product server 106. For example, product identification could identify a service, entity, etc.

Figure 6:
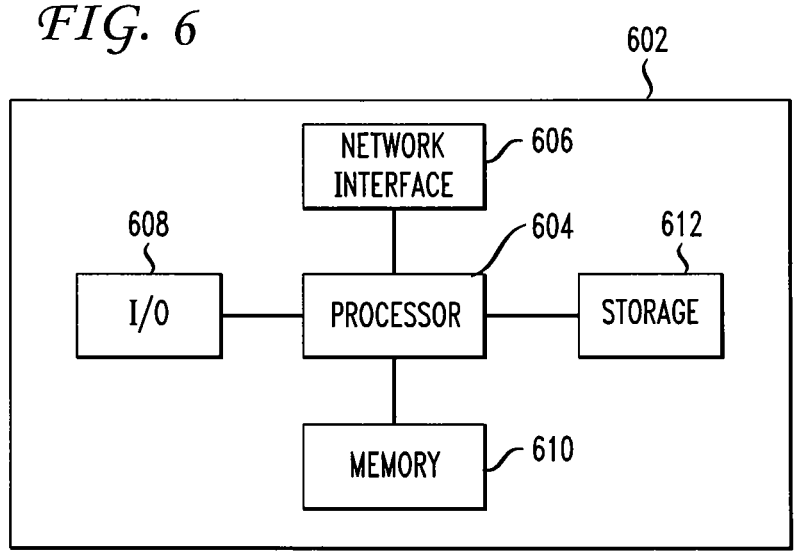
FIG. 6 is a high level block diagram of a computer capable of implementing the present invention.

The above-described methods for providing a user with information based on a QR code and user device information as well as user device 102 and product server 106 may be implemented on a computer using well-known computer processors, memory units, storage devices, computer software, and other components. A high-level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium (e.g., magnetic disk, CD ROM, etc.), and loaded into memory 610 when execution of the computer program instructions is desired. Thus, the method steps of FIG. 2 can be defined by the computer program instructions stored in the memory 610 and/or storage 612 and controlled by the processor 604 executing the computer program instructions. For example, the computer program instructions can be implemented as computer executable code programmed by one skilled in the art to perform an algorithm defined by the method steps of FIG. 2. Accordingly, by executing the computer program instructions, the processor 604 executes an algorithm defined by the method steps of FIG. 2. The computer 602 also includes one or more network interfaces 606 for communicating with other devices via a network. The computer 602 also includes input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for providing product information comprising:
   receiving, at a product server, product identification from a user device derived from a quick response code associated with a particular product;
   receiving user device information comprising a location of the user device when the quick response code was scanned by the user device and identification of a user associated with the user device;
   determining a product configuration of the particular product, the product configuration comprising a hardware configuration and a software configuration based at least in part on the location of the particular product, the location of the particular product based on the location of the user device when the quick response code was scanned by the user device;
   identifying product information based at least in part on the product identification, the product configuration, the identification of the user associated with the user device, and a language of the user associated with the user device, the product information comprising a product manual, a parts list, and a product history specific to the product configuration of the particular product, the product information in the language of the user associated with the user device; and
   transmitting the product information to the user device.

2. The method of claim 1 further comprising:
   storing user device information received from the user device.

3. The method of claim 1 wherein the product information comprises a software update.

4. An apparatus for providing product information comprising:
   means for receiving product identification from a user device derived from a quick response code associated with a particular product;
   means for receiving user device information comprising a location of the user device when the quick response code was scanned by the user device and identification of a user associated with the user device;
   means for determining a product configuration of the particular product, the product configuration comprising a hardware configuration and a software configuration based at least in part on the location of the particular product, the location of the particular product based on the location of the user device when the quick response code was scanned by the user device;
   means for identifying product information based at least in part on the product identification, the product configuration, the identification of the user associated with the user device, and a language of the user associated with the user device, the product information comprising a product manual, a parts list, and a product history specific to the product configuration of the particular product, the product information in the language of the user associated with the user device; and
   means for transmitting the product information to the user device.

5. The apparatus of claim 4 further comprising:
   means for storing user device information received from the user device.

6. The apparatus of claim 4 wherein the product information comprises a software update.

7. A computer-readable medium having instructions stored thereon, the instructions for providing product information, the instructions in response to execution by a computing device cause the computing device to perform operations comprising:
   receiving, at a product server, product identification from a user device derived from a quick response code associated with a particular product;
   receiving user device information comprising a location of the user device when the quick response code was scanned by the user device and identification of a user associated with the user device;
   determining a product configuration of the particular product, the product configuration comprising a hardware configuration and a software configuration based at least in part on the location of the particular product, the location of the particular product based on the location of the user device when the quick response code was scanned by the user device;
   identifying product information based at least in part on the product identification, the product configuration, the identification of the user associated with the user device, and a language of the user associated with the user device, the product information comprising a product manual, a parts list, and a product history specific to the product configuration of the particular product, the product information in the language of the user associated with the user device; and
   transmitting the product information to the user device.

8. The computer-readable medium of claim 7 the operations further comprising storing user device information received from the user device.

9. The computer-readable medium of claim 7 wherein the product information comprises a software update.

\* \* \* \* \*